UNITED STATES PATENT OFFICE.

WILLIAM H. HAWKES, OF BOSTON, MASSACHUSETTS.

COMPOUND FOR TREATING COAL AND OTHER FUEL.

SPECIFICATION forming part of Letters Patent No. 358,200, dated February 22, 1887.

Application filed August 26, 1886. Serial No. 211,922. (No specimens.)

*To all whom it may concern:*

Be it known that I, WILLIAM H. HAWKES, a citizen of the United States, and a resident of Boston, in the county of Suffolk and State of Massachusetts, have invented new and useful Improvements in Compounds for Treating Coal and other Fuel, of which the following is a specification.

This invention relates to a new compound for treating coal and other fuel; and its object is to consume smoke, gas, and soot, and thus cause a saving of the fuel.

The improved compound consists of the following ingredients, in about the following proportions, viz: four pounds sal-ammoniac, twenty pounds sal-niter, fifteen pounds sal-soda, twenty pounds Glauber's salt, forty-one pounds common salt; total, one hundred pounds. These ingredients may be mixed together in any manner in or about the proportions as aforesaid, and preferably finely pulverized, and the mixture is then dissolved in a suitable amount of hot water to make a saturated solution, and to said solution is added cold water according to the nature of the fuel for which it is to be used. In practice I add a greater quantity of water for soft fuel and less for hard fuel.

I usually dissolve six pounds of the mixed ingredients in about eight gallons of water, and this quantity is applied to each ton of fuel, such as coal.

The liquid compound is to be sprinkled over the coal or other fuel when in bulk or when in the act of filling a bin or other receptacle, or in any other suitable manner, according to the nature of the fuel, and the liquid allowed to dry before the fuel is ignited, or the fuel used immediately after treatment, acccording to the use for which it is intended.

Having thus described my invention, what I claim is—

A compound for treating fuel, consisting of sal-ammoniac, sal-niter, sal-soda, Glauber's salt, and common salt, and water, mixed together in the proportions herein described.

In testimony whereof I have signed my name to this specification, in the presence of two subscribing witnesses, on this 24th day of August, A. D. 1886.

WILLIAM H. HAWKES.

Witnesses:
ALBAN ANDRÉN,
HENRY CHADBOURNE.